United States Patent
Ogawa et al.

(10) Patent No.: US 9,373,042 B2
(45) Date of Patent: Jun. 21, 2016

(54) SUBJECT CHANGE DETECTION SYSTEM AND SUBJECT CHANGE DETECTION METHOD

(75) Inventors: Masahiro Ogawa, Susono (JP); Toshiki Kindo, Yokohama (JP); Ryuji Funayama, Yokohama (JP); Akio Fukamachi, Hadano (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/346,062

(22) PCT Filed: Sep. 20, 2011

(86) PCT No.: PCT/JP2011/071399
§ 371 (c)(1),
(2), (4) Date: Oct. 29, 2014

(87) PCT Pub. No.: WO2013/042206
PCT Pub. Date: Mar. 28, 2013

(65) Prior Publication Data
US 2015/0049908 A1 Feb. 19, 2015

(51) Int. Cl.
*G06K 9/00* (2006.01)
*G08G 1/16* (2006.01)
*G06K 9/46* (2006.01)

(52) U.S. Cl.
CPC ........ *G06K 9/00791* (2013.01); *G06K 9/00335* (2013.01); *G06K 9/00348* (2013.01);
(Continued)

(58) Field of Classification Search
CPC .......... G06K 9/00335; G06K 9/00523; G06K 9/4671; G06K 9/00993; G06K 9/6202; G06K 9/00268; G06K 9/00348; G06K 9/00805; G06K 9/00973; G06K 9/4604; G06K 9/6217; G06K 9/00342; G06K 9/00369; G01B 11/14; G01C 21/3629; G06F 3/011; G06F 3/016
See application file for complete search history.

(56) References Cited

U.S. PATENT DOCUMENTS

2005/0288911 A1* 12/2005 Porikli ............................. 703/2
2008/0123968 A1*  5/2008 Nevatia et al. ................ 382/228
(Continued)

FOREIGN PATENT DOCUMENTS

JP    10-283461 A    10/1998
JP    2007-264778 A    10/2007
(Continued)

OTHER PUBLICATIONS

Y. Yamauchi et al., "A Proposal of Classifier Introducing Transition Likelihood Model Based on Quantization Residual," Information Processing Society of Japan, Image Recognition-Cognition Symposium, Japan, Jul. 20, 2011, pp. 373-380. (Japanese language with partial translation of Office Action issued Mar. 24, 2015 in JP Application No. 2013-534490.).

(Continued)

*Primary Examiner* — Ali Bayat
(74) *Attorney, Agent, or Firm* — Kenyon & Kenyon LLP

(57) ABSTRACT

The invention detects a change in a subject by detecting the subject from an image, acquiring a feature quantity distribution that indicates shape information of the detected subject, accumulating the shape information that is indicated by the acquired feature quantity distribution and comparing the shape information a predetermined period of time before with the current shape information by using the accumulated shape information. Here, the invention acquires the feature quantity distribution of the subject from a processing target area extracted from an image area that includes the subject. The invention detects a change in the subject by using accumulated shape change information acquired from the shape information. The invention detects a change in the subject by using averaged shape change information obtained by averaging the shape change information.

10 Claims, 9 Drawing Sheets

(52) U.S. Cl.
CPC ......... *G06K9/00805* (2013.01); *G06K 9/4604* (2013.01); *G06K 9/4671* (2013.01); *G08G 1/166* (2013.01); *B60W 2420/40* (2013.01); *B60W 2550/10* (2013.01)

(56) References Cited

U.S. PATENT DOCUMENTS

2011/0244919 A1* 10/2011 Aller et al. ................. 455/556.1
2012/0218436 A1* 8/2012 Rhoads et al. ............. 348/222.1

FOREIGN PATENT DOCUMENTS

| | | | |
|---|---|---|---|
| JP | 2008-152586 | A | 7/2008 |
| JP | 2010-020594 | A | 1/2010 |
| JP | 2010-102437 | A | 5/2010 |
| JP | 2010-267134 | A | 11/2010 |
| JP | 2011-113313 | A | 6/2011 |
| JP | 2011-130203 | A | 6/2011 |

OTHER PUBLICATIONS

Y. Murai et al., "Human-Area Segmentation Using Chamfer Matching by Selecting Similar Silhouette Images Based on Weak-Classifier Response," IEICE Transactions, Japan, The Institute of Electronics, Information and Communication Engineers, Apr. 1, 2011, vol. J94-D, No. 4, pp. 730-741. (Japanese language with partial translation of Office Action issued Mar. 24, 2015 in JP Application No. 2013-534490.).

I.N. Junejo et al., "View-Independent Action Recognition from Temporal Self-Similarities," IEEE Transactions on Pattern Analysis and Machine Intelligence, IEEE Computer Society, USA, vol. 33, No. 1, Jan. 1, 2011, pp. 172-185.

T. Gandhi et al., "Pedestrian Protection Systems: Issues, Survey, and Challenges," IEEE Transactions on Intelligent Transportation Systems, IEEE, Piscataway, NJ, USA, vol. 8, No. 3, Sep. 1, 2007, pp. 413-430.

D.G. Lowe, "Distinctive Image Features from Scale-Invariant Keypoints," International Journal of Computer Vision, Kluwer Academic Publishers, B0, vol. 60, No. 2, Nov. 1, 2004, pp. 91-110.

* cited by examiner (a)          (b)

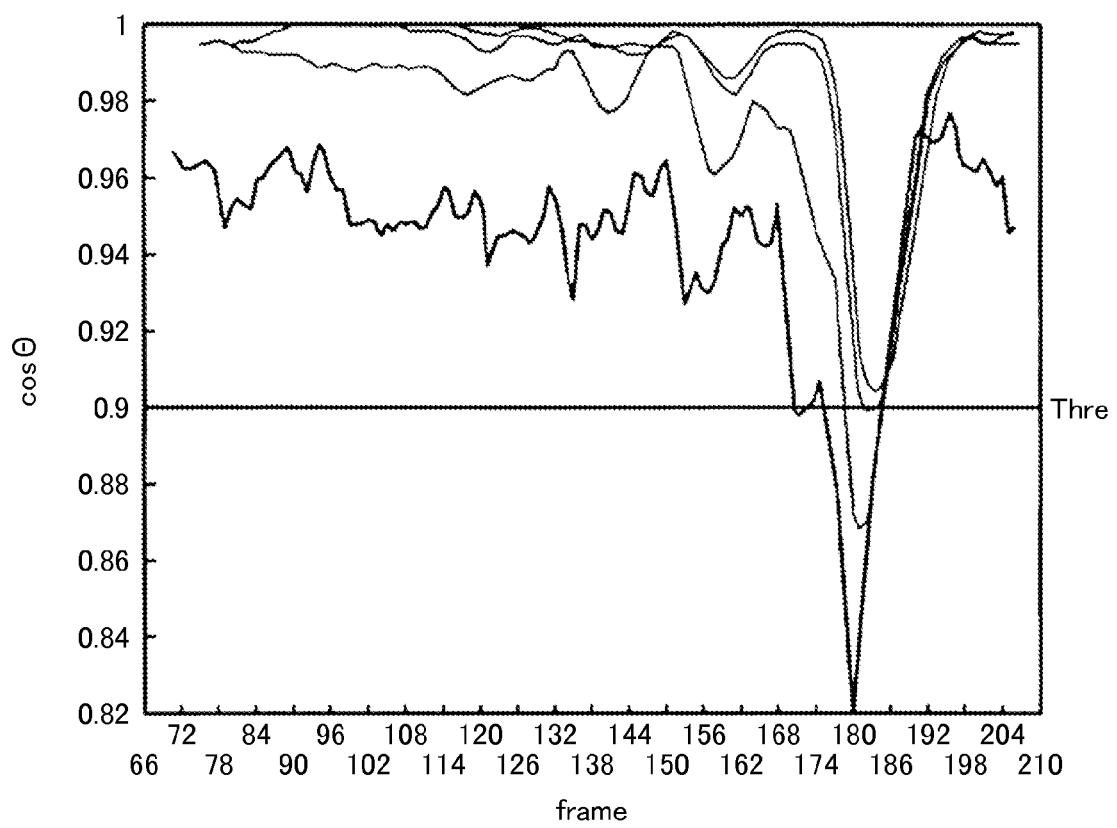

SUBJECT CHANGE DETECTION SYSTEM AND SUBJECT CHANGE DETECTION METHOD

CROSS-REFERENCE TO RELATED APPLICATION

This is a national phase application based on the PCT International Patent Application No. PCT/JP2011/071399 filed on Sep. 20, 2011, the entire contents of which are incorporated herein by reference.

TECHNICAL FIELD

The invention relates to a subject change detection system and a subject change detection method.

BACKGROUND ART

Conventionally, there has been developed a technique for detecting a subject around a vehicle.

For example, Patent Document 1 discloses a pedestrian dash prediction system. The pedestrian dash prediction system acquires a time-series change in the location and moving speed of a pedestrian present ahead of a host vehicle and surrounding information, compares the acquired time-series change in the location and moving speed with the pattern of a time-series change in the location and moving speed of a pedestrian at the time when the pedestrian runs out into a roadway and also compares the acquired surrounding information with pre-obtained surrounding information at the time when a pedestrian runs out into a roadway, and then predicts whether the pedestrian runs out into a roadway on which the host vehicle is traveling.

Patent Document 2 discloses a pedestrian recognition system. The pedestrian recognition system generates an edge image from image data that are input from an external sensor, detects an opening degree W between the right and left legs of a pedestrian candidate and also estimates the head of the pedestrian candidate, estimates the height H of the pedestrian candidate on the basis of the location of the head, and determines whether the ratio (W/H) of the opening degree W between the legs to the height H is larger than or equal to a predetermined value a on the basis of the height H of the pedestrian candidate and the opening degree W between the legs of the pedestrian candidate. Thus, the pedestrian recognition system determines whether there is a possibility that the pedestrian candidate crosses the path of the host vehicle.

Patent Document 3 discloses a vehicle exterior monitoring system. The vehicle exterior monitoring system obtains a location at which a three-dimensional object is present and its distance by generating a histogram for each of sections into which a distance image is divided by predetermined intervals, integrates the sections of which the distance is close as a group, splits each group at a portion at which an arrangement direction of data significantly changes, then re-combines the groups on the basis of mutual positional relationships of the groups, recognizes a single three-dimensional object as a combination of an object and a side wall, and calculates parameters, such as the location of the three-dimensional object and the longitudinal and lateral moving speeds of the three-dimensional object, by calculating the location of a corner point of the three-dimensional object. Thus, the vehicle exterior monitoring system detects the location and behavior of a vehicle diagonally ahead.

RELATED ART DOCUMENT

Patent Document

Patent Document 1: Japanese Patent Application Publication No. 2010-102437 (JP 2010-102437 A)
Patent Document 2: Japanese Patent Application Publication No. 2007-264778 (JP 2007-264778 A)
Patent Document 3: Japanese Patent Application Publication No. 10-283461 (JP 10-283461 A)

SUMMARY OF THE INVENTION

Problem to be Solved by the Invention

However, in the existing techniques (Patent Documents 1 to 3, and the like), there is a problem that it is not possible to quickly and accurately detect a change in a subject around a vehicle.

For example, in the pedestrian dash prediction system described in Patent Document 1, only a change in the location of a pedestrian and a change in the speed of the pedestrian are observed, so it is not possible to predict a dash of the pedestrian until the changes in the location and speed have been determined. Therefore, there is a problem that a prediction of a dash of a pedestrian is slower than that in the case where a prediction is carried out on the basis of the position of a pedestrian (that is, the shape of a subject).

In the pedestrian recognition system described in Patent Document 2, only the leg opening degree W to the height H is observed as the position of a pedestrian (that is, the shape of a subject), so there is a problem that it is not possible to predict a pedestrian that may cross the path of the host vehicle until the pedestrian starts crossing. In the pedestrian recognition system, only one threshold is allowed to be set as the threshold of the leg opening degree W to the height H for all the pedestrians, so there is a problem that it is not possible to predict the action of a pedestrian that runs out with a small step.

In the vehicle exterior monitoring system described in Patent Document 3, a side wall must be present laterally to a vehicle, so there is a problem that it cannot be applied to an expressway having a wide lane width. In the vehicle exterior monitoring system, a distance image is inevitable as an input, so there is a problem that the configuration of the sensor becomes complex.

The invention is contemplated in view of the above situation, and it is an object of the invention to provide a subject change detection system and a subject change detection method that are able to quickly and accurately detect a change in a subject around a vehicle.

Means for Solving the Problem

A subject change detection system according to the invention includes: subject detection means for detecting a subject from an image; shape information acquisition means for acquiring a feature quantity distribution that indicates shape information of the subject detected by the subject detection means; shape information accumulation means for accumulating the shape information that is indicated by the feature quantity distribution acquired by the shape information acquisition means; and subject change detection means for detecting a change in the subject by comparing the shape information a predetermined period of time before with the current shape information by using the shape information accumulated by the shape information accumulation means.

Here, preferably, in the above-described subject change detection system, normalization means for normalizing the shape information that is indicated by the feature quantity distribution acquired by the shape information acquisition means is further included, and the shape information accumulation means accumulates the shape information normalized by the normalization means.

Preferably, in the above-described subject change detection system, the shape information acquisition means acquires the feature quantity distribution of the subject, detected by the subject detection means, by using a predetermined feature quantity, the normalization means acquires a probability distribution corresponding to the feature quantity distribution by normalizing the feature quantity distribution acquired by the shape information acquisition means, the shape information accumulation means accumulates the probability distribution acquired by the normalization means, and the subject change detection means calculates a difference between the probability distribution a predetermined period of time before and the current probability distribution, the probability distributions being accumulated by the shape information accumulation means, by using a predetermined measure, and detects a change in the subject when the calculated difference is larger than a predetermined threshold.

Preferably, the above-described subject change detection system further includes processing target area extraction means for extracting a processing target area from an image area that includes the subject detected by the subject detection means, and the shape information acquisition means acquires the feature quantity distribution of the subject from the processing target area extracted by the processing target area extraction means.

Preferably, the above-described subject change detection system further includes: shape change information acquisition means for acquiring a difference between the probability distribution the predetermined period of time before and the current probability distribution as shape change information of the subject by using the probability distribution accumulated by the shape information accumulation means; and shape change information accumulation means for accumulating the shape change information acquired by the shape change information acquisition means, and the subject change detection means calculates a similarity by using the shape change information accumulated by the shape change information accumulation means, and detects a change in the subject when the similarity is smaller than a predetermined threshold.

Preferably, the above-described subject change detection system further includes shape change averaging means for acquiring averaged shape change information by averaging a plurality of pieces of the shape change information, accumulated by the shape change information accumulation means, and the subject change detection means calculates the similarity by using the averaged shape change information acquired by the shape change averaging means, and detects a change in the subject when the similarity is smaller than the predetermined threshold.

Preferably, in the above-described subject change detection system, the predetermined feature quantity is a feature quantity that is indicated as a probability distribution, and the predetermined feature quantity includes at least one of a first feature quantity that uses a luminance per se of an image, a second feature quantity that uses an edge of an image and a third feature quantity that uses a color of an image.

Preferably, in the above-described subject change detection system, the first feature quantity includes at least one of a luminance, PCA of a luminance, Hu moment, LBP, Haarlike feature and poselet, the second feature quantity includes at least one of SIFT, PCA, SURF, GLOH, shape context, HOG, CoHOG, FIND and edgelet, and the third feature quantity includes at least one of RGB and Lab.

Preferably, in the above-described subject change detection system, the predetermined measure is a measure based on which a difference between probability distributions is measured in distance or pseudodistance.

Preferably, in the above-described subject change detection system, the distance includes at least one of a Manhattan distance, a Euclidean distance, a uniform norm, a Mahalanobis distance and a Hamming distance, and the pseudodistance includes a Kullback-Leibler divergence.

Preferably, in the above-described subject change detection system, the similarity includes a cosine similarity.

A subject change detection method according to the invention includes: a subject detection step of detecting a subject from an image; a shape information acquisition step of acquiring a feature quantity distribution that indicates shape information of the subject detected in the subject detection step; a shape information accumulation step of accumulating the shape information that is indicated by the feature quantity distribution acquired in the shape information acquisition step; and a subject change detection step of detecting a change in the subject by comparing the shape information a predetermination period of time before with the current shape information by using the shape information accumulated in the shape information accumulation step.

Effect of the Invention

The invention has such an advantage that it is possible to quickly and accurately detect a change in a subject around a vehicle.

BRIEF DESCRIPTION OF THE DRAWINGS

FIG. 9 is a view that shows an example of a change detection graph according to the fourth embodiment.

MODES FOR CARRYING OUT THE INVENTION

Hereinafter, embodiments of a subject change detection system and a subject change detection method according to the invention will be described in detail with reference to the drawings. The invention is not limited by these embodiments. Components in the following embodiments include ones that can be easily conceived of by persons skilled in the art or substantially equivalent ones.

Figure 1:
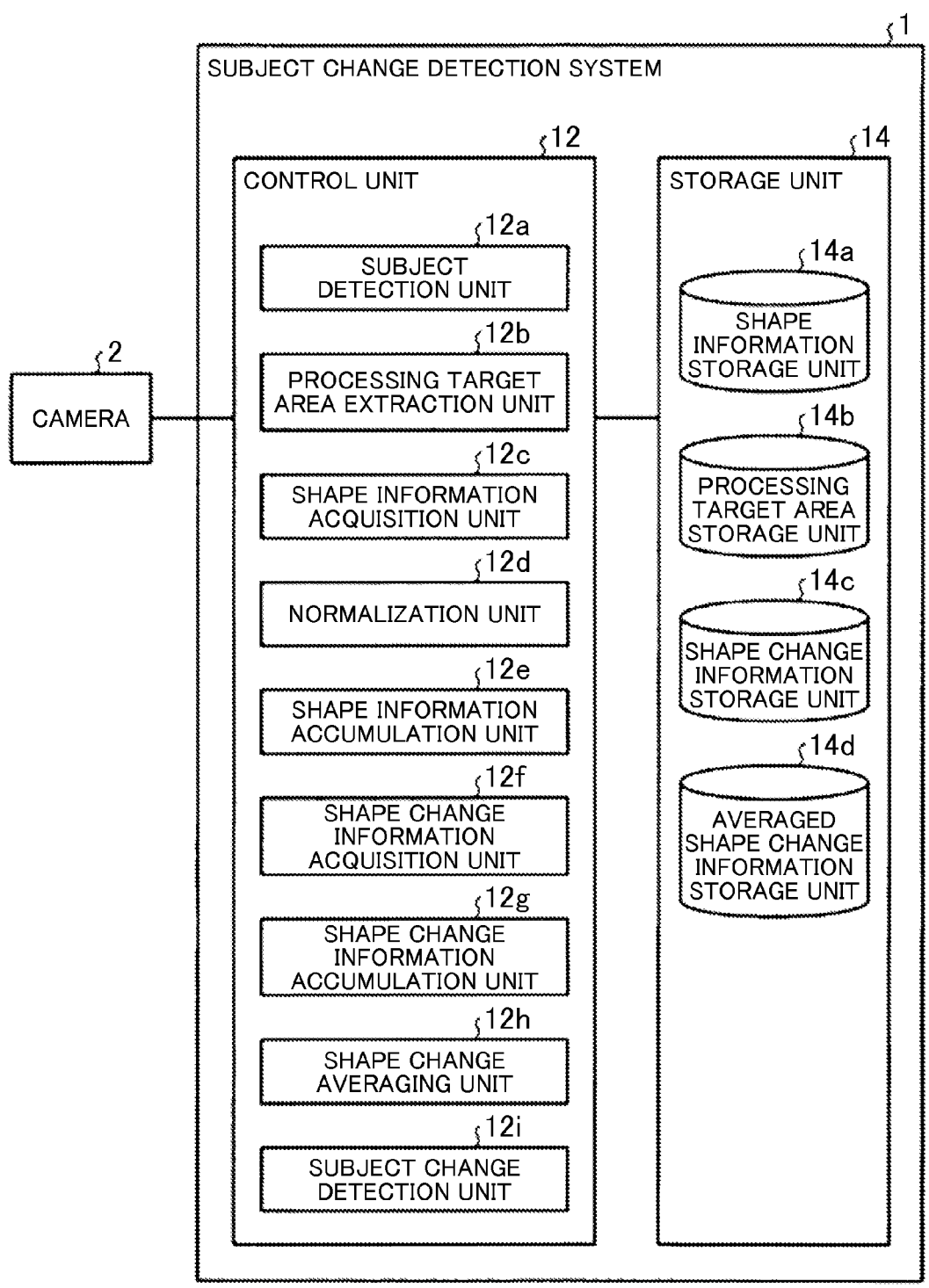
FIG. 1 is a block diagram that shows an example of the configuration of a subject change detection system according to the invention.

The configuration of the subject change detection system according to the invention will be described with reference to FIG. 1. FIG. 1 is a block diagram that shows an example of the configuration of the subject change detection system according to the invention.

As shown in FIG. 1, the subject change detection system 1 is, for example, formed by using a vehicle-mounted automobile controlling computer, or the like, and is communicably connected to a camera 2 mounted on the vehicle. The camera 2 is a device that captures an image around the host vehicle and generates image data that contain the image around the host vehicle. The camera 2 is, for example, a CCD camera, a CMOS camera, or the like, that is able to capture an image in a visible light range or an infrared range. The camera 2 is installed at any location at which the camera 2 is able to capture an image around the vehicle, such as images forward, laterally and rearward of the vehicle.

The subject change detection system 1 includes a control unit 12 and a storage unit 14. The control unit 12 comprehensively controls the subject change detection system 1, and is, for example, a CPU (central processing unit), or the like. The storage unit 14 stores data, and is, for example, a RAM (random access memory), a ROM (read only memory), a hard disk drive, or the like.

The storage unit 14 includes a shape information storage unit 14a, a processing target area storage unit 14b, a shape change information storage unit 14c and an averaged shape change information storage unit 14d.

The shape information storage unit 14a is shape information storage means for storing shape information of a subject extracted from image data. The subject includes at least one of moving objects, such as a pedestrian, a bicycle, a motorcycle and a vehicle, present around the host vehicle. The subject may be part of a subject, such as a door of a vehicle. The shape information is data that indicates a feature quantity of the shape of a subject. The feature quantity is not limited to it. The feature quantity includes at least one of a first feature quantity that uses the luminance per se of image data, a second feature quantity that uses an edge of image data and a third feature quantity that uses the color of image data. The first feature quantity, for example, includes at least one of a luminance, PCA of a luminance, Hu moment, LBP, Haarlike feature and poselet. The second feature quantity, for example, includes at least one of SIFT, PCA, SURF, GLOH, shape context, HOG, CoHOG, FIND and edgelet. The third feature quantity, for example, includes at least one of RGB and Lab.

The processing target area storage unit 14b is processing target area storage means for storing a processing target area corresponding to part of an image area of image data that include a subject. The shape change information storage unit 14c is shape change information storage means for storing shape change information that indicates a temporal change in shape information within a predetermined period of time. The averaged shape change information storage unit 14d is averaged shape change information storage means for storing averaged shape change information that indicates the average of pieces of shape change information.

The control unit 12 includes a subject detection unit 12a, a processing target area extraction unit 12b, a shape information acquisition unit 12c, a normalization unit 12d, a shape information accumulation unit 12e, a shape change information acquisition unit 12f, a shape change information accumulation unit 12g, a shape change averaging unit 12h and a subject change detection unit 12i.

The subject detection unit 12a is subject detection means for detecting a subject from an image. The subject detection unit 12a detects a subject through pattern matching, or the like, by using data that indicate the outline of the shape of the subject stored in the storage unit 14 in advance.

The processing target area extraction unit 12b is processing target area extraction means for extracting a processing target area from an image area that includes the subject detected by the subject detection unit 12a. The processing target area is a predetermined area that is effective to a subject change detection process that is executed by the subject change detection unit 12i (described later). For example, when the subject is a pedestrian, the processing target area includes only the whole of the pedestrian, an area that includes only the lower-half body of the pedestrian, or the like. The processing target area extraction unit 12b may store the extracted processing target area in the processing target area storage unit 14b.

The shape information acquisition unit 12c is shape information acquisition means for acquiring a feature quantity distribution that indicates shape information of the subject detected by the subject detection unit 12a. Specifically, the shape information acquisition unit 12c acquires the feature quantity distribution of the subject detected by the subject detection unit 12a by using a predetermined feature quantity. Here, the predetermined feature quantity is a feature quantity that is allowed to be expressed as a probability distribution, and includes at least one of the above-described first feature quantity, second feature quantity and third feature quantity. The shape information acquisition unit 12c may acquire the feature quantity of the subject from the processing target area extracted by the processing target area extraction unit 12b or the processing target area stored in the processing target area storage unit 14b.

The normalization unit 12d is normalization means for normalizing the shape information that is expressed by the feature quantity distribution acquired by the shape information acquisition unit 12c. Specifically, the normalization unit 12d acquires a probability distribution corresponding to the feature quantity distribution by normalizing the feature quantity distribution acquired by the shape information acquisition unit 12c.

The shape information accumulation unit 12e is shape information accumulation means for accumulating the shape information that is expressed by the feature quantity distribution acquired by the shape information acquisition unit 12c. Here, the shape information accumulation unit 12e accumulates the shape information normalized by the normalization unit 12d. Specifically, the shape information accumulation unit 12e accumulates the probability distribution acquired by the normalization unit 12d. That is, the shape information accumulation unit 12e stores the normalized shape information (probability distribution) in the shape information storage unit 14a. In the present embodiment, the shape information accumulation unit 12e may accumulate the pre-normalized feature quantity distribution acquired by the shape information acquisition unit 12c.

The shape change information acquisition unit 12f is shape change information acquisition means for acquiring a difference between the probability distribution a predetermined period of time before and the current probability distribution as the shape change information of the subject by using the normalized shape information accumulated by the shape information accumulation unit 12e, that is, the probability distributions stored in the shape information storage unit 14a.

The shape change information accumulation unit 12g is shape change information accumulation means for accumulating the shape change information acquired by the shape change information acquisition unit 12f. That is, the shape change information accumulation unit 12g stores the acquired shape change information in the shape change information storage unit 14c.

The shape change averaging unit 12h is shape change averaging means for acquiring averaged shape change information by averaging the plurality of pieces of shape change information, accumulated by the shape change information accumulation unit 12g, that is, the shape change information stored in the shape change information storage unit 14c. The shape change averaging unit 12h may store the acquired averaged shape change information in the averaged shape change information storage unit 14d.

The subject change detection unit 12 is subject change detection means for detecting a change in the subject by comparing the shape information the predetermined period of time before with the current shape information by using the shape information accumulated by the shape information accumulation unit 12e, that is, the shape information stored in the shape information storage unit 14a. The change in the subject means a change in the subject, which is dangerous in a traffic environment, and includes a change in the shape at the time of the start of a change in the motion of the subject. The change in the subject is not limited to it. The change in the subject, for example, includes a change that a pedestrian or a bicycle suddenly changes its motion and runs out into a road, a change that a vehicle or a motorcycle, traveling side by side, suddenly changes the lane and cuts into a traveling lane, a change that a vehicle ahead suddenly starts making a U-turn, a change that a vehicle ahead suddenly starts making a right or left turn in order to enter a shop, or the like, on a roadside, a change that a door of a parked vehicle suddenly opens, and the like.

Specifically, the subject change detection unit 12i calculates a difference between the probability distribution a predetermined period of time before and the current probability distribution, the probability distributions being stored in the shape information storage unit 14a, by using a predetermined measure, and detects a change in the subject when the calculated difference is larger than a predetermined threshold. The predetermined measure is a measure based on which a difference between probability distributions is measured in distance or pseudodistance. The distance is not limited to it, and includes an Lp norm, such as an L1 norm (Manhattan distance), an L2 norm (Euclidean distance) and an L infinity norm (uniform norm). The distance may include a Mahalanobis distance. When the Mahalanobis distance is used, a distribution is desirably generated from a plurality of past vectors p(t). The distance may include a Hamming distance. When the Hamming distance is used, numeric values are desirably somewhat discretized. The pseudodistance is not limited to it, and includes a Kullback-Leibler divergence (hereinafter, referred to as KL divergence). Here, the KL divergence is a measure based on which a difference between the two probability distributions P, Q is measured, and is known in the information theory field.

In the present embodiment, when a pre-normalized feature quantity distribution has been accumulated by the shape information accumulation unit 12e, the subject change detection unit 12i may acquire probability distributions respectively corresponding to the feature quantity distribution the predetermined period of time before and the current feature quantity distribution by respectively normalizing the feature quantity distribution the predetermined period of time before and the current feature quantity distribution, which are stored in the shape information storage unit 14a, may calculate a difference between the acquired probability distribution the predetermined period of time before and the current probability distribution by using the predetermined measure, and may detect a change in the subject when the calculated difference is larger than the predetermined threshold.

Here, the subject change detection unit 12i may calculate a similarity by using the shape change information accumulated by the shape change information accumulation unit 12g, that is, the shape change information stored in the shape change information storage unit 14c, and may detect a change in the subject when the similarity is smaller than a predetermined threshold. The similarity is not limited to it, and includes a cosine similarity, and the like. The subject change detection unit 12i may calculate a similarity by using the averaged shape change information acquired by the shape change averaging unit 12h or the averaged shape change information stored in the averaged shape change information storage unit 14d, and may detect a change in the subject when the similarity is smaller than the predetermined threshold.

Subsequently, the subject change detection process that is executed in the above-described subject change detection system 1 will be described with reference to FIG. 2 to FIG. 9. Hereinafter, the subject change detection process that is executed in the subject change detection system 1 according to the invention will be described in order of first to fourth embodiments. In the following subject change detection process, a pedestrian is described as an example of the subject that is present around the vehicle; however, the subject is not limited to it. A SIFT feature quantity is described as an example of the feature quantity that indicates the shape of the subject; however, the feature quantity is not limited to it. A KL divergence is described as an example of the measure based on which a difference between the probability distributions P, Q is measured; however, the measure is not limited to it.

First Embodiment

Figure 2:
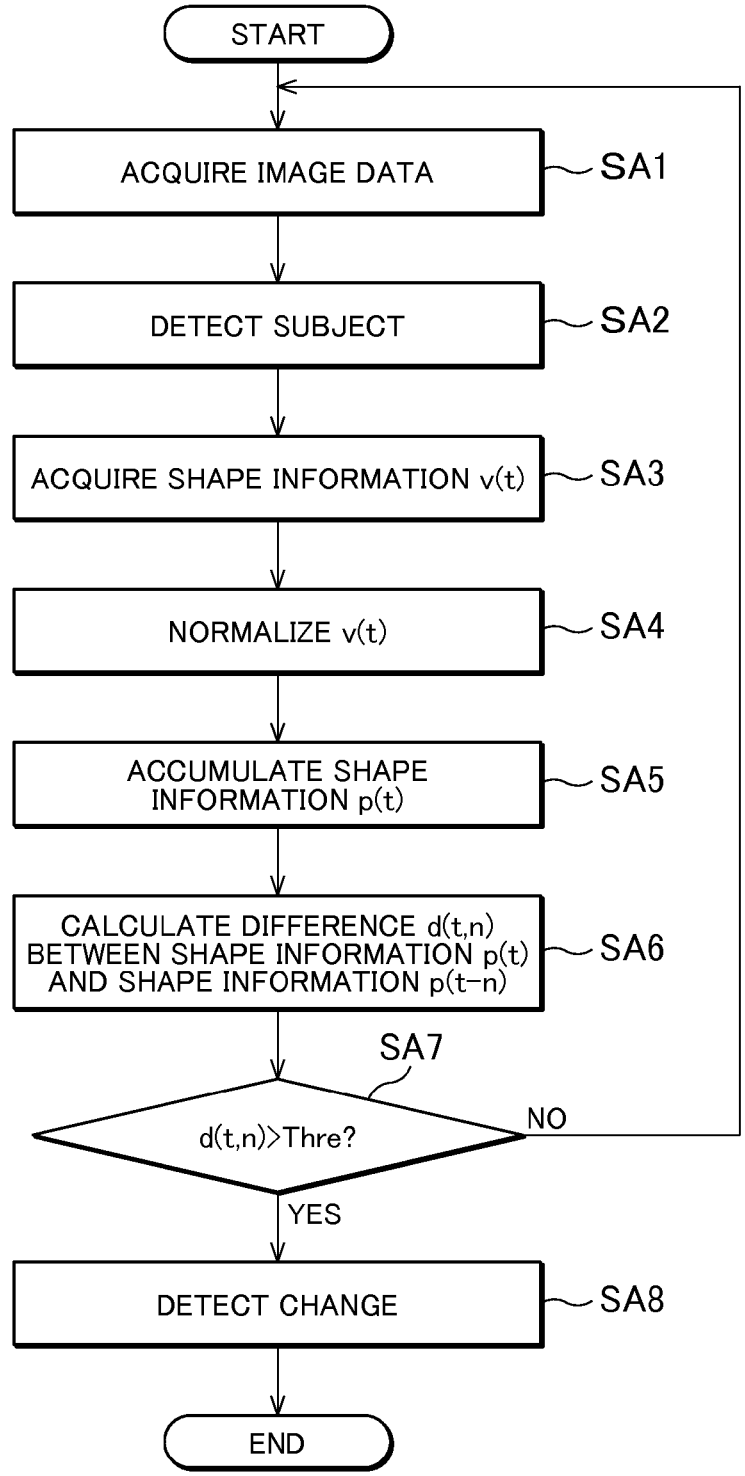
FIG. 2 is a flowchart that shows an example of a subject change detection process according to a first embodiment.
Figure 3:
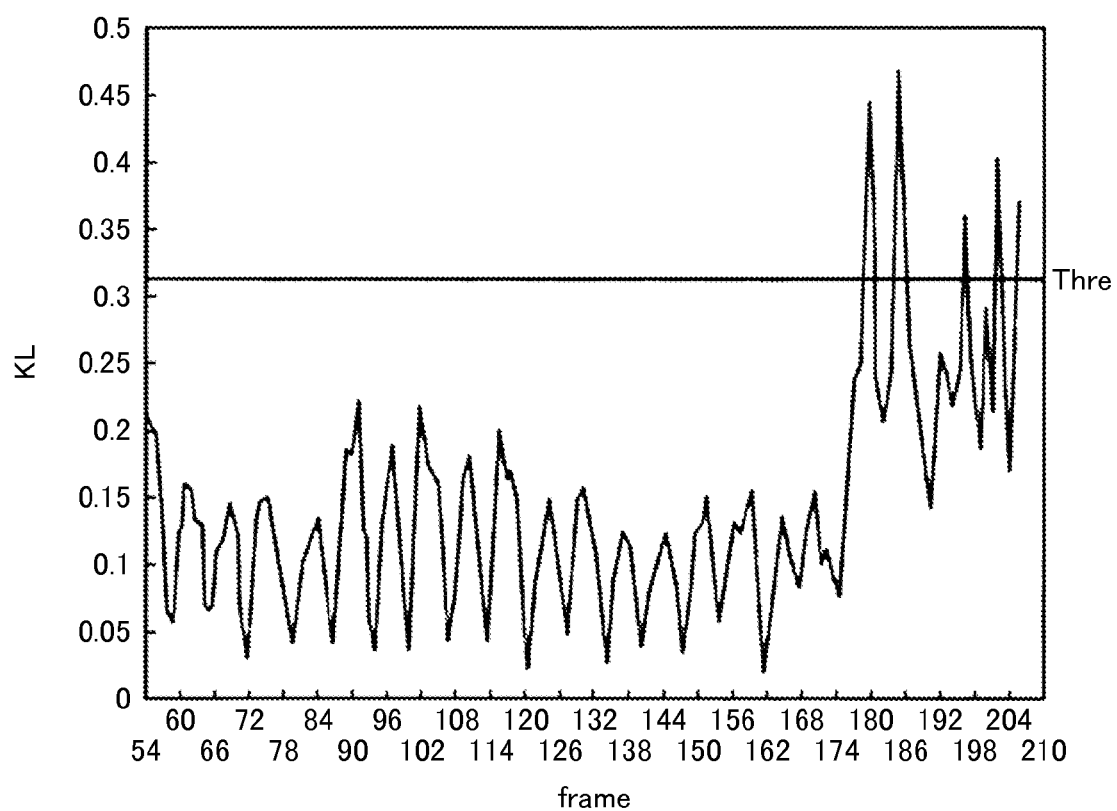
FIG. 3 is a view that shows an example of a change detection graph according to the first embodiment.

In the first embodiment, the subject change detection process that is executed in the subject change detection system 1 including the subject detection unit 12a, the shape information acquisition unit 12c, the normalization unit 12d, the shape information accumulation unit 12e and the subject change detection unit 12i will be described with reference to FIG. 2 and FIG. 3. FIG. 2 is a flowchart that shows an example of the subject change detection process according to the first embodiment. FIG. 3 is a view that shows an example of a change detection graph according to the first embodiment.

As shown in FIG. 2, initially, the control unit 12 of the subject change detection system 1 acquires image data, including an image around the host vehicle, from the camera 2 (step SA1).

Subsequently, the subject detection unit 12a of the subject change detection system 1 detects a pedestrian as a subject from the image data acquired in step SA1 (step SA2). For example, the subject detection unit 12a detects the subject through pattern matching, or the like, by using data that indicate the outline of the shape of the subject, such as a pedestrian, prestored in the storage unit 14.

Subsequently, the shape information acquisition unit 12c of the subject change detection system 1 acquires a feature quantity distribution indicating shape information of the subject detected in step SA2 (step SA3). Specifically, the shape information acquisition unit 12c calculates a SIFT feature quantity as the feature quantity distribution v(t) indicating the shape information from the subject detected in step SA2. Here, the SIFT feature quantity is known in the image recognition field, and the like, as a feature quantity that indicates a shape. The SIFT feature quantity is able to indicate in histogram that an edge in which orientation is distributed at which portion of the image data that include the subject, so the SIFT feature quantity is indicated as a probability distribution.

Subsequently, the normalization unit 12d acquires a feature quantity (probability distribution) p(t) by normalizing the L1 norm of the feature quantity distribution v(t) acquired in step SA3 to 1 as shown in the following mathematical expression (1) (step SA4).

[Mathematical Expression 1]

$$\Sigma_i |p_i(t)| = 1 \quad \text{Mathematical Expression (1)}$$

Subsequently, the shape information accumulation unit 12e of the subject change detection system 1 accumulates the shape information, acquired in step SA4, in the shape information storage unit 14a (step SA5). That is, the shape information accumulation unit 12e accumulates the feature quantity (probability distribution) p(t) normalized in step SA4.

Subsequently, the control unit 12 of the subject change detection system 1 calculates a difference d(t,n) between the feature quantity n frames before and the current feature quantity from the feature quantities (probability distributions) p(t) accumulated in step SA5 as shown in the following mathematical expression (2) (step SA6). The control unit 12 calculates the difference d(t,n) by using a KL divergence as shown in the following mathematical expression (3).

[Mathematical Expression 2]

$$d(t,n) = D_{KL}(p(t) \| p(t-n)) \quad \text{Mathematical Expression (2)}$$

[Mathematical Expression 3]

$$D_{KL}(P \| Q) = \Sigma_i P(i) \log \frac{P(i)}{Q(i)} \quad \text{Mathematical Expression (3)}$$

Subsequently, the subject change detection unit 12i determines whether the difference d(t,n) calculated in step SA6 is larger than a predetermined threshold Thre as shown in FIG. 3 (step SA7). In FIG. 3, the ordinate axis represents KL divergence, and the abscissa axis represents time frame. FIG. 3 shows a state where the subject pedestrian is moving along a sidewalk from frame 54 to frame 174, and shows a state where the pedestrian has suddenly changed its motion at frame 180.

When the subject change detection unit 12i has determined in step SA7 that the difference d(t,n) is larger than the threshold Thre (step SA7: Yes), the subject change detection unit 12i determines that there is a change in the subject (step SA8). After that, the subject change detection process is ended. After the process of step SA8, the process may return to step SA1, and the subject change detection process may be repeatedly executed.

When the subject change detection unit 12i has determined in step SA7 that the difference d(t,n) is smaller than the threshold Thre (step SA7: No), the subject change detection unit 12i returns to the process of step SA1.

In this way, in the first embodiment, the subject change detection unit 12i detects a change in the subject by comparing the shape information the predetermined period of time before with the current shape information by using the accumulated shape information. After that, after the subject change detection unit 12i completes determination as to whether there is a change in the subject, the subject change detection unit 12i returns to image acquisition of the next frame j.

As described above, according to the first embodiment, it is possible to quickly and accurately detect a change in the subject around the vehicle as compared to the existing technique. For example, in the pedestrian dash prediction system described in Patent Document 1 according to the existing technique, there is a problem that a prediction of a dash of a pedestrian becomes slower than that in the case where a prediction is carried out on the basis of the position of a pedestrian (that is, the shape of a subject); whereas, according to the first embodiment, a change in the subject, which is dangerous in a traffic environment (for example, a dash of a pedestrian) is detected on the basis of the shape of the subject, so it is possible to quickly and accurately detect a change in the subject around the vehicle. In the pedestrian recognition system described in Patent Document 2 according to the existing technique, there is a problem that it is not possible to predict a pedestrian that may cross the path of the host vehicle until the pedestrian starts crossing and it is not possible to predict the action of a pedestrian that runs out with a small step; whereas, according to the first embodiment, it is possible to detect a change in the subject before the pedestrian starts crossing irrespective of the step of the pedestrian, so it is possible to quickly and accurately detect a change in the subject around the vehicle. In the vehicle exterior monitoring system described in Patent Document 3 according to the existing technique, there is a problem that it cannot be applied to an expressway having a wide lane width and the configuration of the sensor is complex; whereas, according to the first embodiment, it is possible to achieve subject change detection with a simple configuration of the camera irrespective of whether there is a sidewalk. In this way, according to the first embodiment, when a dangerous change in the subject around the vehicle occurs while a driver is driving the vehicle, it is possible to quickly and accurately inform the driver of the danger, so it is possible to reduce the possibility of occurrence of a traffic accident.

Here, the dangerous change in the subject around the vehicle may be classified into a continuous change and a discontinuous change. For example, when the subject is a pedestrian, the continuous change may be an action that the pedestrian enters from a sidewalk into a roadway at a constant speed in a straight line, or the like. On the other hand, the discontinuous change may be an action that the pedestrian suddenly turns the direction of movement and enters into a roadway side in a state where the pedestrian is moving along a sidewalk, an action that the pedestrian suddenly moves at a high speed in a state where the pedestrian is moving at a low speed along a sidewalk, an action that the pedestrian suddenly starts moving in a state where the pedestrian is stopped, or the like. With the existing technique, it is possible to detect the continuous change (for example, an action that the subject continuously moves, an action that the subject stops in a state where the subject is moving, an action that the subject decelerates, or the like) through linear prediction; however, it is not possible to quickly and accurately detect the discontinuous change.

On the other hand, the subject change detection system 1 according to the first embodiment detects a subject from an image, acquires a feature quantity distribution indicating shape information of the detected subject by using a predetermined feature quantity, acquires a probability distribution corresponding to the feature quantity distribution by normalizing the acquired feature quantity distribution, and accumulates the acquired probability distribution. The subject change detection system 1 according to the first embodiment calculates a difference between the accumulated probability distribution a predetermined period of time before and the accumulated current probability distribution by using a predetermined measure, and detects a change in the subject when the calculated difference is larger than a predetermined threshold. Thus, with the subject change detection system 1 according to the first embodiment, it is possible to quickly and accurately detect the discontinuous change (for example, an action that the subject starts moving in a state where the subject is stopped, an action that the subject accelerates, an action that the subject turns the direction, or the like) with which the existing technique cannot sufficiently deal. For example, according to the first embodiment, when there occurs a dangerous change in the subject around the vehicle, such as a case where a pedestrian or a bicycle suddenly changes its movement and runs out into a road, a case where a vehicle or a motorcycle, traveling side by side, suddenly changes the lane and cuts into a traveling lane, a case where a vehicle ahead suddenly starts making a U-turn, a case where a vehicle ahead suddenly starts making a right or left turn in order to enter a shop, or the like, on a roadside, or a case where a change that a door of a parked vehicle suddenly opens, as an example of the discontinuous change, it is possible to quickly and accurately inform the driver of the danger, so it is possible to reduce the possibility of occurrence of a traffic accident.

Second Embodiment

Figure 4:
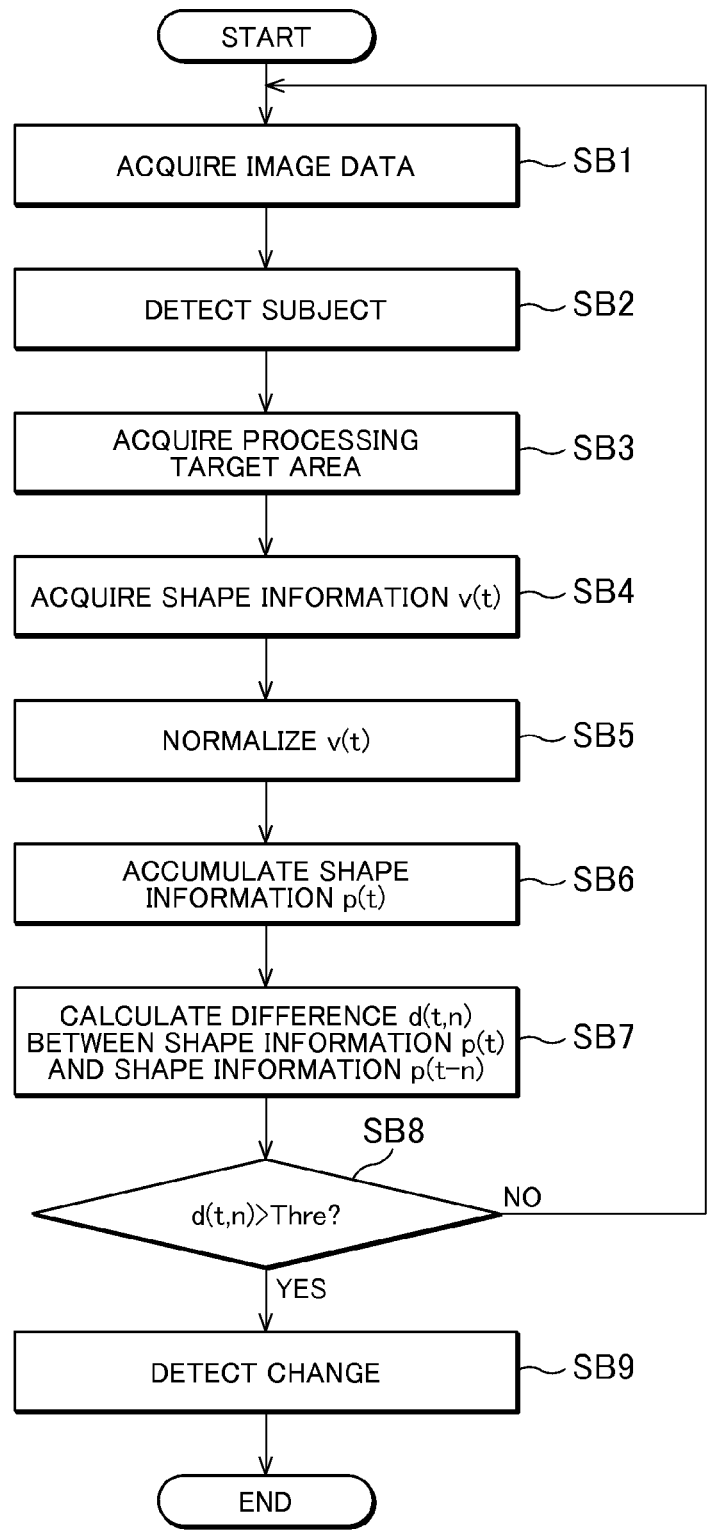
FIG. 4 is a flowchart that shows an example of a subject change detection process according to a second embodiment.
Figure 5:
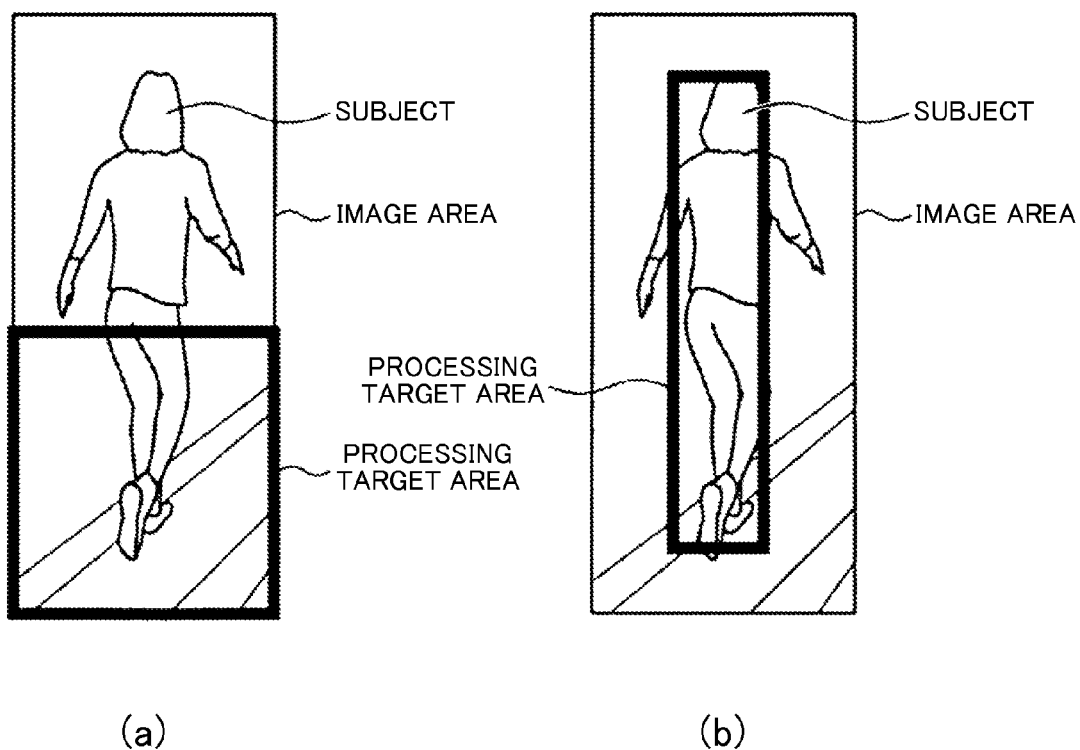
FIG. 5 is a view that shows an example of a subject image area and a processing target area according to the second embodiment.

In the second embodiment, a subject change detection process that is executed in the subject change detection system 1 including the subject detection unit 12a, the processing target area extraction unit 12b, the shape information acquisition unit 12c, the normalization unit 12d, the shape information accumulation unit 12e and the subject change detection unit 12i will be described with reference to FIG. 4 and FIG. 5. FIG. 4 is a flowchart that shows an example of the subject change detection process according to the second embodiment. FIG. 5 is a view that shows an example of a subject image area and a processing target area according to the second embodiment.

As shown in FIG. 4, initially, the control unit 12 of the subject change detection system 1 acquires image data, including an image around the host vehicle, from the camera 2 (step SB1).

Subsequently, the subject detection unit 12a of the subject change detection system 1 detects a pedestrian as a subject from the image data acquired in step SB1 (step SB2).

Subsequently, the processing target area extraction unit 12b of the subject change detection system 1 extracts a processing target area from an image area that includes the subject detected in step SB2 (step SB3). Specifically, as shown in FIG. 5, the processing target area extraction unit 12b extracts the processing target area (area surrounded by the wide line in FIG. 5(a) or FIG. 5(b)), which is an area effective to the subject change detection process, through pattern matching, or the like, within the image area that includes the subject. In FIG. 5(a), when the subject is a pedestrian, a change in the shape of the lower-half body is important, so the processing target area is set to the lower half of the image area. In FIG. 5(b), when the subject is a pedestrian, a background image, such as the line of a sidewalk, is an area unnecessary for the change detection process, so the processing target area is set so as to include only the whole of the pedestrian. Here, the processing target area extraction unit 12b may store the extracted processing target area in the processing target area storage unit 14b.

Subsequently, the shape information acquisition unit 12c of the subject change detection system 1 acquires shape information of the subject from the processing target area extracted in step SB3 (step SB4). Specifically, the shape information acquisition unit 12c calculates a SIFT feature quantity as a feature quantity distribution v(t) indicating the shape information of the subject from the processing target area extracted in step SB3.

Subsequently, the normalization unit 12d acquires a feature quantity (probability distribution) p(t) by normalizing the L1 norm of the feature quantity distribution v(t) acquired in step SB4 to 1 as shown in the following mathematical expression (1) (step SB5).

[Mathematical Expression 4]

$$\Sigma_i |p_i(t)| = 1 \qquad \text{Mathematical Expression (1)}$$

Subsequently, the shape information accumulation unit 12e of the subject change detection system 1 accumulates the shape information, acquired in step SB5, in the shape information storage unit 14a (step SB6). That is, the shape information accumulation unit 12e accumulates the feature quantity (probability distribution) p(t) normalized in step SB5.

Subsequently, the control unit 12 of the subject change detection system 1 calculates a difference d(t,n) between the feature quantity n frames before and the current feature quantity from the feature quantities (probability distributions) p(t) accumulated in step SB6 as shown in the following mathematical expression (2) (step SB7). The control unit 12 calculates the difference d(t,n) by using a KL divergence as shown in the following mathematical expression (3).

[Mathematical Expression 5]

$$d(t,n) = D_{KL}(p(t) \| p(t-n)) \qquad \text{Mathematical Expression (2)}$$

[Mathematical Expression 6]

$$D_{KL}(P \| Q) = \Sigma_i P(i) \log \frac{P(i)}{Q(i)} \qquad \text{Mathematical Expression (3)}$$

Subsequently, the subject change detection unit 12i determines whether the difference d(t,n) calculated in step SB7 is larger than the predetermined threshold Thre as shown in the above-described FIG. 3 (step SB8).

When the subject change detection unit 12i has determined that the difference d(t,n) is larger than the threshold Thre in step SB8 (step SB8: Yes), the subject change detection unit 12i determines that there is a change in the subject (step SB9). After that, the subject change detection process is ended. After the process of step SB9, the process may return to step SB1, and the subject change detection process may be repeatedly executed.

When the subject change detection unit 12i has determined that the difference d(t,n) is smaller than the threshold Thre in step SB8 (step SB8: No), the subject change detection unit 12i returns to the process of step SB1.

In this way, in the second embodiment, the shape information acquisition unit 12c acquires shape information of the subject from the extracted processing target area, and the subject change detection unit 12i detects a change in the subject by comparing the shape information the predetermined period of time before with the current shape information by using the accumulated shape information. After that, after the subject change detection unit 12i completes determination as to whether there is a change in the subject, the subject change detection unit 12i returns to image acquisition of the next frame j.

As described above, according to the second embodiment, the range in which a change in the shape of the subject is detected is limited, so it is possible to improve the detection accuracy and calculation speed of the subject change detection process. Thus, according to the second embodiment, it is possible to quickly and accurately detect a change in the subject around the vehicle, so it is possible to further reduce the possibility of occurrence of a traffic accident.

Third Embodiment

Figure 6:
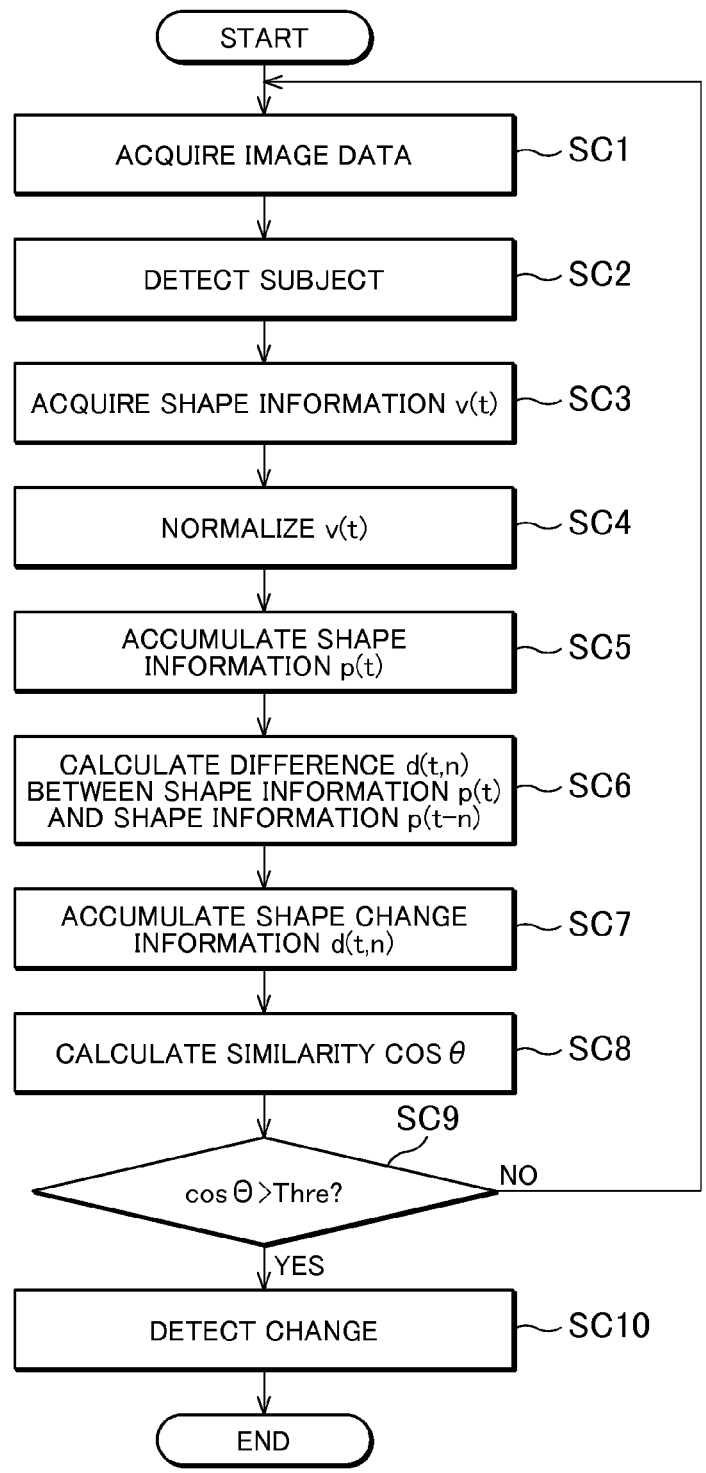
FIG. 6 is a flowchart that shows an example of a subject change detection process according to a third embodiment.
Figure 7:
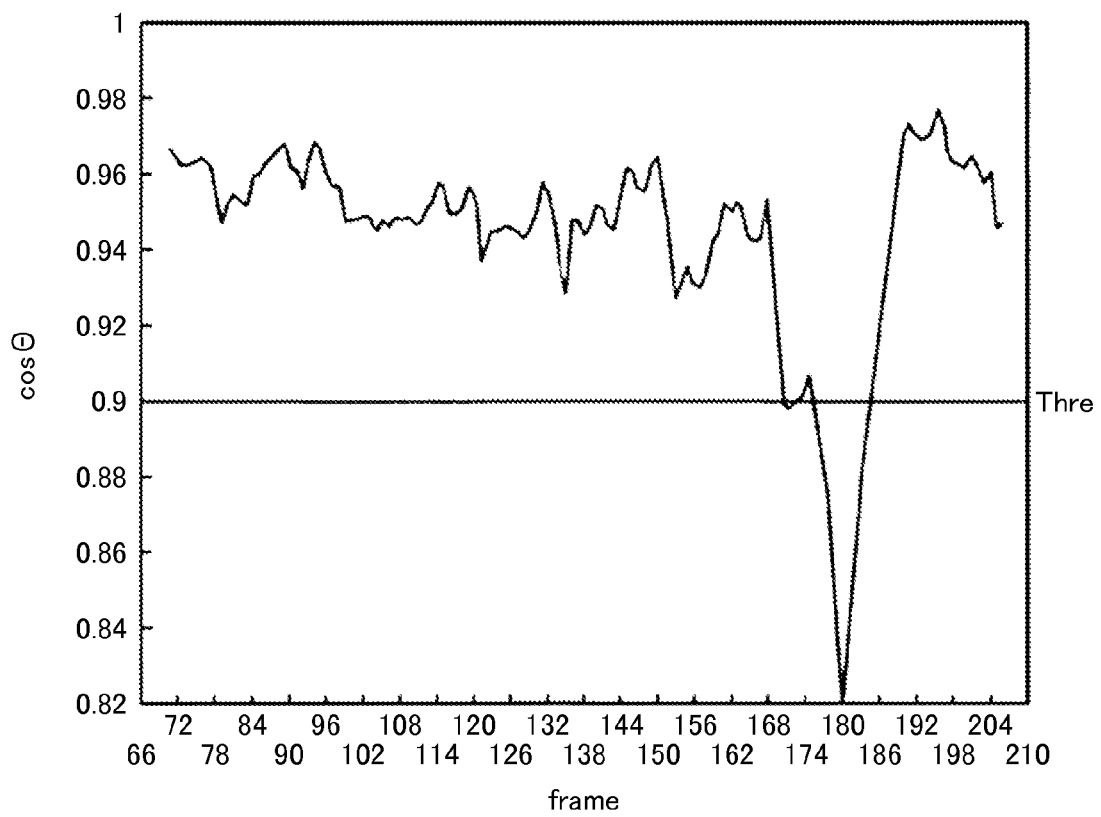
FIG. 7 is a view that shows an example of a change detection graph according to the third embodiment.

In the third embodiment, a subject change detection process that is executed in the subject change detection system 1 including the subject detection unit 12a, the shape information acquisition unit 12c, the normalization unit 12d, the shape information accumulation unit 12e, the shape change information acquisition unit 12f, the shape change information accumulation unit 12g and the subject change detection unit 12i will be described with reference to FIG. 6 and FIG. 7. FIG. 6 is a flowchart that shows an example of the subject change detection process according to the third embodiment. FIG. 7 is a view that shows an example of a change detection graph according to the third embodiment.

As shown in FIG. 6, initially, the control unit 12 of the subject change detection system 1 acquires image data, including an image around the host vehicle, from the camera 2 (step SC1).

Subsequently, the subject detection unit 12a of the subject change detection system 1 detects a pedestrian as a subject from the image data acquired in step SC1 (step SC2).

Subsequently, the shape information acquisition unit 12c of the subject change detection system 1 acquires the shape information of the subject detected in step SC2 (step SC3). Specifically, the shape information acquisition unit 12c calculates a SIFT feature quantity as a feature quantity distribution v(t) indicating the shape information from the subject detected in step SC2.

Subsequently, the normalization unit 12d acquires a feature quantity (probability distribution) p(t) by normalizing the L1 norm of the feature quantity distribution v(t) acquired in step SC3 to 1 as shown in the following mathematical expression (1) (step SC4).

[Mathematical Expression 7]

$$\Sigma_i |p_i(t)|=1 \quad \text{Mathematical Expression (1)}$$

Subsequently, the shape information accumulation unit 12e of the subject change detection system 1 accumulates the shape information, acquired in step SC4, in the shape information storage unit 14a (step SC5). That is, the shape information accumulation unit 12e accumulates the feature quantity (probability distribution) p(t) normalized in step SC4.

Subsequently, the shape change information acquisition unit 12f of the subject change detection system 1 calculates a difference d(t,n) (that is, in the present third embodiment, the shape change information) between the feature quantity n frames before and the current feature quantity from the feature quantities (probability distributions) p(t) accumulated in step SC5 as shown in the following mathematical expression (2) (step SC6). The shape change information acquisition unit 12f calculates the difference d(t,n) as the shape change information by using a KL divergence as shown in the following mathematical expression (3). In this way, the shape change information acquisition unit 12f acquires the shape change information of the subject by using the shape information accumulated in step SC5.

[Mathematical Expression 8]

$$d(t,n)=D_{KL}(p(t)\|p(t-n)) \quad \text{Mathematical Expression (2)}$$

[Mathematical Expression 9]

$$D_{KL}(P\|Q) = \Sigma_i P(i)\log\frac{P(i)}{Q(i)} \quad \text{Mathematical Expression (3)}$$

Subsequently, the shape change information accumulation unit 12g of the subject change detection system 1 accumulates the shape change information d(t,n), acquired in step SC6, in the shape change information storage unit 14c (step SC7). Specifically, the shape change information accumulation unit 12g calculates a vector u(t,n,l) shown in the following mathematical expression (4) and obtained by accumulating the shape change information d(t,n), calculated in step SC6, by l frames.

[Mathematical Expression 10]

$$u(t,n,l)=(d(t-l+1,n), \ldots ,d(t,n)) \quad \text{Mathematical Expression (4)}$$

Subsequently, the subject change detection unit 12i of the subject change detection system 1 calculates a similarity cos θ by using the following mathematical expression (5) and mathematical expression (6) (step SC8). Here, the similarity cos θ is a similarity of an n-dimensional vector that is generally used in the technical field at the time when a similarity is analyzed in an n-dimensional space. Specifically, the similarity cos θ is called a cosine similarity, means the cosine cos θ of an angle A formed by vectors, and uses a proximity between the orientations of vectors as an index of similarity. A maximum value 1 is taken when the orientations of vectors coincide with each other, 0 is taken when the orientations of vectors go straight are perpendicular to each other, and a minimum value −1 is taken when the orientations of vectors are opposite.

[Mathematical Expression 11]

$$I=(1,1, \ldots 1):l \text{ dim} \quad \text{Mathematical Expression (5)}$$

[Mathematical Expression 12]

$$\cos\Theta(t, n, l) = \frac{u \cdot I}{\|u\|\|I\|} = \frac{\Sigma_i u_i}{l\|u\|} \quad \text{Mathematical Expression (6)}$$

Subsequently, the subject change detection unit 12i of the subject change detection system 1 determines whether the similarity cos θ calculated in step SC8 is smaller than a predetermined threshold Thre as shown in FIG. 7 (step SC9). In FIG. 7, the ordinate axis represents cos θ, and the abscissa axis represents time frame. FIG. 7 shows a state where the subject pedestrian is moving along a sidewalk from frame 66 to frame 162, and shows a state where the pedestrian has suddenly changed its motion from frame 168 to frame 180.

When the subject change detection unit 12i has determined in step SC9 that the similarity cos θ is smaller than the threshold Thre (step SC9: Yes), the subject change detection unit 12i determines that there is a change in the subject (step SC10). After that, the subject change detection process is ended. After the process of step SC10, the process may return to step SC1, and the subject change detection process may be repeatedly executed.

When the subject change detection unit 12*i* has determined in step SC9 that the similarity cos θ is larger than or equal to the threshold Thre (step SC9: No), the subject change detection unit 12*i* returns to the process of step SC1.

In this way, in the third embodiment, the shape change information acquisition unit 12*f* acquires a difference between shape information a predetermined period of time before and current shape information as the shape change information of the subject by using the accumulated shape information, and the shape change information accumulation unit 12*g* accumulates the acquired shape change information. The subject change detection unit 12*i* calculates a similarity by using the accumulated shape change information, and detects a change in the subject when the similarity is smaller than the predetermined threshold. After that, after the subject change detection unit 12*i* completes determination as to whether there is a change in the subject, the subject change detection unit 12*i* returns to image acquisition of the next frame j.

As described above, according to the third embodiment, a temporal change in the shape information of the subject is accumulated as the shape change information, and a similarity is analyzed by using a cosine similarity, so it is possible to further improve the detection accuracy of the subject change detection process. Thus, according to the third embodiment, it is possible to further quickly and accurately detect the subject around the vehicle, so it is possible to further reduce the possibility of occurrence of a traffic accident. In the third embodiment, an example in which a similarity is compared with a threshold at the time of detecting a change in the subject is described; however, the configuration is not limited to it. The subject change detection system 1 according to the third embodiment may detect a change in the subject only on the basis of whether there is a similarity.

Fourth Embodiment

Figure 8:
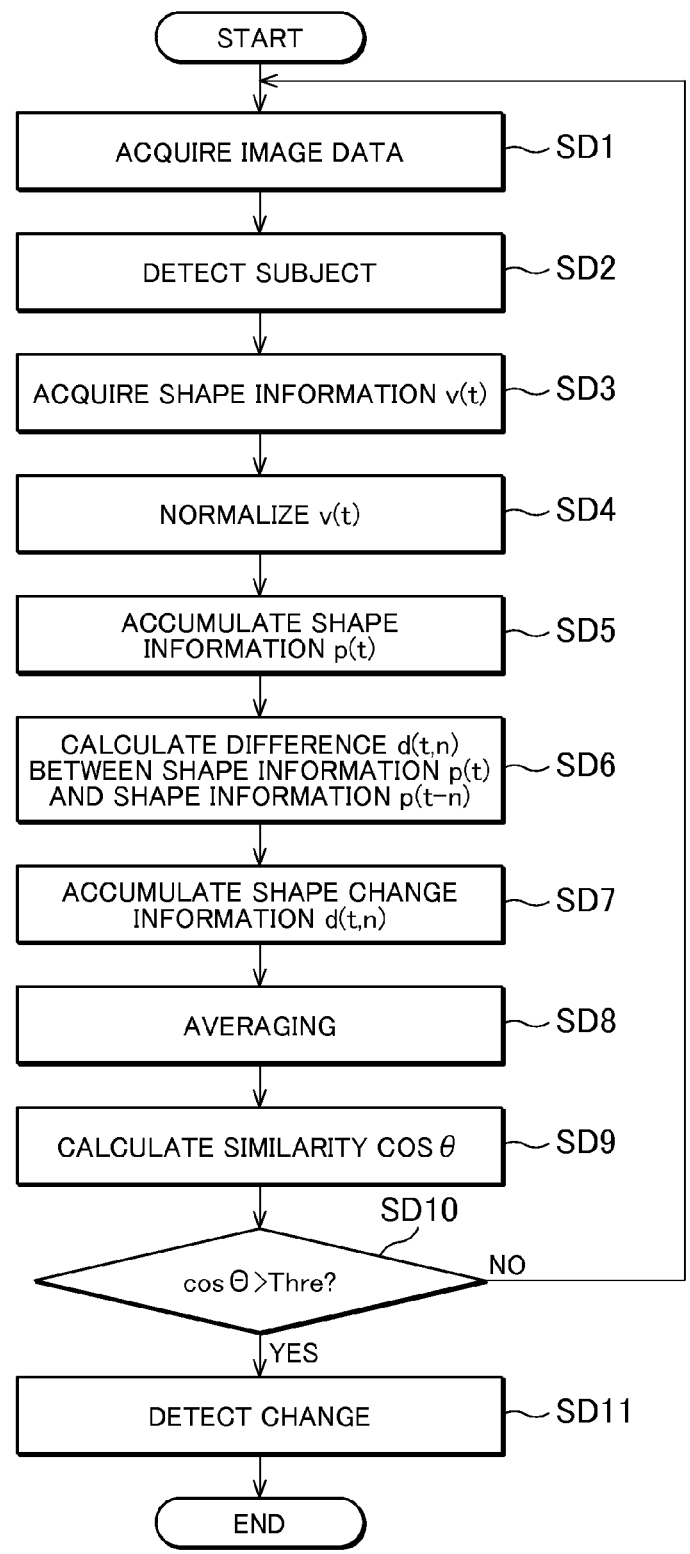
FIG. 8 is a flowchart that shows an example of a subject change detection process according to a fourth embodiment.

In the fourth embodiment, a subject change detection process that is executed in the subject change detection system 1 including the subject detection unit 12*a*, the shape information acquisition unit 12*c*, the normalization unit 12*d*, the shape information accumulation unit 12*e*, the shape change information acquisition unit 12*f*, the shape change information accumulation unit 12*g*, the shape change averaging unit 12*h* and the subject change detection unit 12*i* will be described with reference to FIG. 8 and FIG. 9. FIG. 8 is a flowchart that shows an example of the subject change detection process according to the fourth embodiment. FIG. 9 is a view that shows an example of the change detection graph according to the fourth embodiment.

As shown in FIG. 8, initially, the control unit 12 of the subject change detection system 1 acquires image data, including an image around the host vehicle, from the camera 2 (step SD1).

Subsequently, the subject detection unit 12*a* of the subject change detection system 1 detects a pedestrian as a subject from the image data acquired in step SD1 (step SD2).

Subsequently, the shape information acquisition unit 12*c* of the subject change detection system 1 acquires the shape information of the subject detected in step SD2 (step SD3). Specifically, the shape information acquisition unit 12*c* calculates a SIFT feature quantity as a feature quantity distribution v(t) indicating the shape information from the subject detected in step SD2.

Subsequently, the normalization unit 12*d* acquires a feature quantity (probability distribution) p(t) by normalizing the L1 norm of the feature quantity distribution v(t) acquired in step SD3 to 1 as shown in the following mathematical expression (1) (step SD4).

[Mathematical Expression 13]

$$\Sigma_i |p_i(t)| = 1 \qquad \text{Mathematical Expression (1)}$$

Subsequently, the shape information accumulation unit 12*e* of the subject change detection system 1 accumulates the shape information, acquired in step SD4, in the shape information storage unit 14*a* (step SD5). That is, the shape information accumulation unit 12*e* accumulates the feature quantity (probability distribution) p(t) normalized in step SD4.

Subsequently, the shape change information acquisition unit 12*f* of the subject change detection system 1 calculates a difference d(t,n) (that is, in the present fourth embodiment, the shape change information) between the feature quantity n frames before and the current feature quantity from the feature quantities (probability distributions) p(t) accumulated in step SD5 as shown in the following mathematical expression (2) (step SD6). The shape change information acquisition unit 12*f* calculates the difference d(t,n) as the shape change information by using a KL divergence as shown in the following mathematical expression (3). In this way, the shape change information acquisition unit 12*f* acquires the shape change information of the subject by using the shape information accumulated in step SD5.

[Mathematical Expression 14]

$$d(t,n) = D_{KL}(p(t) \| p(t-n)) \qquad \text{Mathematical Expression (2)}$$

[Mathematical Expression 15]

$$D_{KL}(P \| Q) = \Sigma_i P(i) \log \frac{P(i)}{Q(i)} \qquad \text{Mathematical Expression (3)}$$

Subsequently, the shape change information accumulation unit 12*g* of the subject change detection system 1 accumulates the shape change information d(t,n), acquired in step SD6, in the shape change information storage unit 14*c* (step SD7). Specifically, the shape change information accumulation unit 12*g* calculates a vector u(t,n,l) shown in the following mathematical expression (4) and obtained by accumulating the shape change information d(t,n), calculated in step SD6, by l frames.

[Mathematical Expression 16]

$$u(t,n,l) = (d(t-l+1,n), \ldots, d(t,n)) \qquad \text{Mathematical Expression (4)}$$

Subsequently, the shape change averaging unit 12*h* of the subject change detection system 1 reduces noise by taking a time average through further addition of K vectors (t,n,l) calculated in step SD7 by using the following mathematical expression (7) (step SD8). In this way, the shape change averaging unit 12*h* acquires a vector u(t,K,n,l) as averaged shape change information by averaging the plurality of pieces of shape change information, accumulated in step SD7.

[Mathematical Expression 17]

$$u(t, K, n, l) = \sum_{k=0}^{K} u(t-k, n, l) \qquad \text{Mathematical Expression (7)}$$

Subsequently, the subject change detection unit 12*i* of the subject change detection system 1 calculates a similarity cos θ by using the following mathematical expression (5) and mathematical expression (6) (step SD9).

[Mathematical Expression 18]

$$I=(1,1,\ldots 1){:}l\ \dim \qquad \text{Mathematical Expression (5)}$$

[Mathematical Expression 19]

$$\cos\Theta(t, K, n, l) = \frac{U \cdot I}{\|U\|\|I\|} = \frac{\Sigma_i U_i}{l\|U\|} \qquad \text{Mathematical Expression (6)}$$

Subsequently, the subject change detection unit 12*i* of the subject change detection system 1 determines whether the similarity cos θ calculated in step SD9 is smaller than a predetermined threshold Thre as shown in FIG. 9 (step SD10). In FIG. 9, the ordinate axis represents cos θ, and the abscissa axis represents time frame. FIG. 9 shows the case where a time average of four samples (K=4) is taken. As shown in FIG. 9, the four samples all indicate a steep change near frame 180, showing a state where the pedestrian has suddenly changed its motion near frame 180.

When the subject change detection unit 12*i* has determined in step SD10 that the similarity cos θ is smaller than the threshold Thre (step SD10: Yes), the subject change detection unit 12*i* determines that there is a change in the subject (step SD11). After that, the subject change detection process is ended. After the process of step SD11, the process may return to step SD1, and the subject change detection process may be repeatedly executed.

When the subject change detection unit 12*i* has determined in step SD10 that the similarity cos θ is larger than or equal to the threshold Thre (step SD10: No), the subject change detection unit 12*i* returns to the process of step SD1.

In this way, in the fourth embodiment, the shape change information acquisition unit 12*f* acquires a difference between shape information a predetermined period of time before and current shape information as the shape change information of the subject by using the accumulated shape information, and the shape change information accumulation unit 12*g* accumulates the acquired shape change information. In addition, the shape change averaging unit 12*h* acquires averaged shape change information by averaging the plurality of accumulated pieces of shape change information. The subject change detection unit 12*i* calculates a similarity by using the acquired averaged shape change information, and detects a change in the subject when the similarity is smaller than the predetermined threshold. After that, after the subject change detection unit 12*i* completes determination as to whether there is a change in the subject, the subject change detection unit 12*i* returns to image acquisition of the next frame j.

As described above, according to the fourth embodiment, a temporal change in the shape information of the subject is accumulated as the shape change information, and a similarity is analyzed by using an averaged cosine similarity, so it is possible to further improve the detection accuracy of the subject change detection process as compared to the third embodiment. Thus, according to the fourth embodiment, it is possible to further quickly and accurately detect the subject around the vehicle, so it is possible to further reduce the possibility of occurrence of a traffic accident.

Other than the above, the subject change detection system 1 according to the invention may be implemented by a combination of the above-described first to fourth embodiments as needed. The subject change detection system 1 may selectively use the first to fourth embodiments on the basis of a complexity of the background of an image that includes the subject. For example, when the vehicle is traveling in a town, the background presumably becomes complex because various objects are included in the background that includes a pedestrian or another vehicle, which is a subject. In this case, the subject change detection system 1 according to the invention may implement the fourth embodiment in order to reduce noise of the background image. For example, when traveling on an expressway, a background that includes another vehicle or a motorcycle, which is a subject, presumably becomes relatively simple. In this case, the subject change detection system 1 according to the invention may implement the first embodiment having a small calculation load. The subject change detection system 1 according to the invention may execute the process of detecting a continuous change by carrying out existing linear prediction in parallel with the process of detecting a discontinuous change, described in the first to fourth embodiments.

DESCRIPTION OF REFERENCE NUMERALS 1 subject change detection system
12 control unit
12*a* subject detection unit
12*b* processing target area extraction unit
12*c* shape information acquisition unit
12*d* normalization unit
12*e* shape information accumulation unit
12*f* shape change information acquisition unit
12*g* shape change information accumulation unit
12*h* shape change averaging unit
12*i* subject change detection unit
14 storage unit
14*a* shape information storage unit
14*b* processing target area storage unit
14*c* shape change information storage unit
14*d* averaged shape change information storage unit
2 camera

The invention claimed is:

1. A vehicle, comprising:
a camera; and
a control unit including a central processing unit and storage unit for controlling a subject change detection system of the control unit, the subject change detection system further comprising:
a subject detection unit configured to acquire image data, including an image around the vehicle, from the camera and detect a subject from the acquired image data;
a shape information acquisition unit configured to acquire, by using a predetermined feature quantity, a feature quantity distribution that indicates shape information of the subject detected by the subject detection unit;
a normalization unit configured to acquire a probability distribution corresponding to the feature quantity distribution by normalizing the feature quantity distribution acquired by the shape information acquisition unit;
a shape information accumulation unit configured to acquire the probability distribution acquired by the normalization unit; and
a subject change detection unit configured to calculate a difference between the probability distribution a predetermined period of time before and the current probability distribution, the probability distributions being accumulated by the shape information accumulation unit, by using a predetermined measure and detect a change in the subject when the calculated difference is larger than a predetermined threshold.

2. The subject change detection system according to claim 1, further comprising:
a processing target area extraction unit configured to extract a processing target area from an image area that includes the subject detected by the subject detection unit, wherein
the shape information acquisition unit is configured to acquire the feature quantity distribution of the subject from the processing target area extracted by the processing target area extraction unit.

3. The subject change detection system according to claim 1, further comprising:
a shape change information acquisition unit configured to acquire a difference between the probability distribution the predetermined period of time before and the current probability distribution as shape change information of the subject by using the probability distributions accumulated by the shape information accumulation unit; and
a shape change information accumulation unit configured to accumulate the shape change information acquired by the shape change information acquisition unit, wherein
the subject change detection unit is configured to calculate a similarity by using the shape change information accumulated by the shape change information accumulation unit, and detect a change in the subject when the similarity is smaller than a predetermined threshold.

4. The subject change detection system according to claim 3, further comprising:
a shape change averaging unit configured to acquire averaged shape change information by averaging a plurality of pieces of the shape change information, accumulated by the shape change information accumulation unit, wherein
the subject change detection unit is configured to calculate the similarity by using the averaged shape change information acquired by the shape change averaging unit, and detect a change in the subject when the similarity is smaller than the predetermined threshold.

5. The subject change detection system according to claim 4, wherein the similarity includes a cosine similarity.

6. The subject change detection system according to claim 1, wherein:
the predetermined feature quantity is a feature quantity that is indicated as a probability distribution; and
the predetermined feature quantity includes at least one of a first feature quantity that uses a luminance per se of an image, a second feature quantity that uses an edge of an image and a third feature quantity that uses a color of an image.

7. The subject change detection system according to claim 6, wherein:
the first feature quantity includes at least one of a luminance, PCA of a luminance, Hu moment, LBP, Haarlike feature and poselet;
the second feature quantity includes at least one of SIFT, PCA, SURF, GLOH, shape context, HOG, CoHOG, FIND and edgelet; and
the third feature quantity includes at least one of RGB and Lab.

8. The subject change detection system according to claim 1, wherein the predetermined measure is a measure based on which a difference between probability distributions is measured in distance or pseudodistance.

9. The subject change detection system according to claim 8, wherein:
the distance includes at least one of a Manhattan distance, a Euclidean distance, a uniform norm, a Mahalanobis distance and a Hamming distance; and
the pseudodistance includes a Kullback-Leibler divergence.

10. A vehicle control method for a vehicle including a camera and a control unit, the control unit having a central processing unit and storage unit, the vehicle control method comprising the step of:
controlling a subject change detection system with the control unit, the control unit configured to control the subject change detection system for:
acquiring image data, including an image around the vehicle, from the camera and detecting a subject from the acquired image data;
acquiring, by using a predetermined feature quantity, a feature quantity distribution that indicates shape information of the detected subject;
acquiring a probability distribution corresponding to the feature quantity distribution by normalizing the acquired feature quantity distribution;
accumulating the acquired probability distribution; and
calculating a difference between the probability distribution a predetermined period of time before and the current probability distribution by using a predetermined measure and detecting a change in the subject when the calculated difference is larger than a predetermined threshold.

* * * * *